United States Patent
Takahashi (10) Patent No.: US 6,812,914 B1
(45) Date of Patent: Nov. 2, 2004

(54) METHOD OF IMAGE STICKING PREVENTION AND RECOVERY TREATMENT FOR FERROELECTRIC LIQUID CRYSTAL DEVICE

(75) Inventor: Rintaro Takahashi, Tokorozawa (JP)

(73) Assignee: Citizen Watch Co., Ltd., Tokyo (JP)

( * ) Notice: Subject to any disclaimer, the term of this patent is extended or adjusted under 35 U.S.C. 154(b) by 0 days.

(21) Appl. No.: 09/355,740

(22) PCT Filed: Nov. 26, 1998

(86) PCT No.: PCT/JP98/05330

§ 371 (c)(1),
(2), (4) Date: Aug. 4, 1999

(87) PCT Pub. No.: WO95/32945

PCT Pub. Date: Dec. 7, 1995

(30) Foreign Application Priority Data

Dec. 5, 1997 (JP) .............................. 9-334716
Dec. 18, 1997 (JP) .............................. 9-348880

(51) Int. Cl.[7] ................................................ G09G 3/36
(52) U.S. Cl. ............................ 345/97; 345/92; 345/93; 345/94; 345/95; 345/96; 345/98; 345/100; 349/33; 349/34
(58) Field of Search ............................ 345/97, 96, 95, 345/94, 93, 92, 98, 100, 87; 349/33, 34

(56) References Cited

U.S. PATENT DOCUMENTS 5,528,394 A * 6/1996 Yeoh et al. ................. 349/123
5,659,411 A * 8/1997 Nito et al. ................... 349/117
5,677,706 A * 10/1997 Inoue et al. ................. 345/100
5,790,223 A * 8/1998 Hanyu et al. ................ 349/184
5,895,108 A * 4/1999 Tanaka ........................ 349/173
6,072,454 A * 6/2000 Nakai et al. .................. 345/97
6,307,610 B1 * 10/2001 Jones .......................... 349/133

FOREIGN PATENT DOCUMENTS

JP          2-29619         1/1990

* cited by examiner

Primary Examiner—Richard Hjerpe
Assistant Examiner—Jean Lesperance
(74) Attorney, Agent, or Firm—Finnegan, Henderson, Farabow, Garrett & Dunner, L.L.P.

(57) ABSTRACT

Disclosed is a method of treatment for preventing the occurrence of image sticking and recovering from image sticking in a ferroelectric liquid crystal device. By applying a low-frequency AC voltage to the ferroelectric liquid crystal device, multiple domains are formed in a pixel, domain boundaries are caused to flow, and fine segmentation of domain regions are induced. As the low-frequency AC voltage, a voltage having a frequency of 10 to 100 Hz and an amplitude of ±1.5 to ±3.0 V is applied, for example, for 30 seconds or more. The low-frequency AC voltage is applied to the liquid crystal device immediately before stopping liquid crystal driving or immediately after starting liquid crystal driving. Further, the low-frequency AC voltage is applied when the occurrence of image sticking in the liquid crystal device is detected.

17 Claims, 9 Drawing Sheets

_METHOD OF IMAGE STICKING PREVENTION AND RECOVERY TREATMENT FOR FERROELECTRIC LIQUID CRYSTAL DEVICE_

TECHNICAL FIELD

The present invention relates to a method of treatment for improving the quality of a ferroelectric liquid crystal device. More particularly, the invention relates to a method of treatment for preventing image sticking that occurs when a liquid crystal is held in one of its stable states for a long period of time, and for recovering the liquid crystal from image sticking if image sticking occurs at all.

BACKGROUND ART

Liquid crystal devices are used not only for display devices but also for spatial light modulators such as optical shutters.

Ferroelectric liquid crystals have two stable states, hereinafter called the one stable state and the other stable state. In a liquid crystal device using a ferroelectric liquid crystal, an image is displayed, or the device is operated as an optical shutter, by switching each pixel from the one stable state to the other stable state.

Ferroelectric liquid crystals have the property that when an applied voltage is removed, the immediately previous state, i.e., the one or the other of the stable states, is retained (this property is hereinafter called the "memory property"). Accordingly, the ferroelectric liquid crystal, once set in a stable state, remains in a stable state until a voltage greater than the threshold is applied for a certain length of time.

Further, since ferroelectric liquid crystal molecules each possess spontaneous polarization, when the ferroelectric liquid crystal molecules in a pixel are in one stable state, an electric field pointing in one direction occurs in the liquid crystal layer of the pixel.

When one of the stable states is maintained for a long time, for example, a few milliseconds or a few seconds, ionic impurities in the liquid crystal layer agglomerate by being attracted in the direction of the electric field. This disrupts the electric symmetry in the liquid crystal layer. As a result, when the liquid crystal is switched from one stable state to the other stable state, a portion of the liquid crystal returns to that one stable state and contrast degrades. This phenomenon is called the "image sticking phenomenon". This phenomenon is a factor that works to degrade the quality of the liquid crystal device. For example, when the ferroelectric liquid crystal device is used as a display device, if the image sticking phenomenon occurs, the previously displayed image remains visible, degrading the display quality.

To prevent such image sticking, it is imperative to avoid setting all the ferroelectric liquid crystal in the pixel in the same state when leaving the ferroelectric liquid crystal in the non-driven state, i.e., in one of the stable states, for a long period of time. That is, the electric field formed in the liquid crystal layer by the spontaneous polarization must be canceled by having the two stable states exist simultaneously.

Japanese Patent Unexamined Publication No. 2-225592 discloses a technique which involves adding an impurity ion adsorbing material to the liquid crystal in order to prevent the occurrence of image sticking. However, it is not always possible to adsorb all the impurity ions.

Further, Japanese Patent Unexamined Publication No. 2-165122 discloses a technique which periodically applies positive and negative electric fields during the non-driven period to switch the direction of the liquid crystal alignment from one direction to another. This method, however, not only requires a complex circuit configuration, but does not function property if, for some reason, the power is cut off.

On the other hand, once image sticking has occurred, the liquid crystal does not recover by itself if the liquid crystal is driven in the usual way; therefore, a treatment for recovery becomes necessary. One known method of recovery treatment involves the heat treatment hereinafter described. The temperature of the liquid crystal is first raised to the temperature of the isotropic phase, and then the temperature is gradually lowered to the temperature of the nematic phase; this causes the long axes of the molecules to align in the same direction. When the temperature is further lowered to the temperature of the smectic A phase, not only the molecular long axes but also the molecular centers of mass align. When the temperature is further lowered into the smectic C phase, the molecules are realigned in the original state. As a result, the image sticking is removed, and the quality of the liquid crystal device is thus recovered. This series of heat treating operations is called the isotropic treatment.

A ferroelectric liquid crystal device designed to perform the isotropic treatment is equipped with a plate-like heating element for heating and a temperature sensing element for sensing the temperature of the liquid crystal so that the temperature can be raised to the temperature of the isotropic phase.

The prior art isotropic treatment, however, requires heating the whole panel to heat all the liquid crystal elements to the temperature of the isotropic phase and then gradually cooling it to the operating temperature. This clearly reduces time efficiency and increases power consumption.

DISCLOSURE OF THE INVENTION

An object of the present invention is to provide a simple and reliable method of treatment for image sticking prevention to prevent the image sticking that occurs when the ferroelectric liquid crystal in a ferroelectric liquid crystal device is held in one of its stable states for a long time. Earlier, the length of time to hold the liquid crystal in one of the stable states was described as being a few milliseconds or a few seconds. In contrast, in the present invention, image sticking can be prevented even when the liquid crystal has been held in one of the stable states for a few hours or tens of hours.

Another object of the present invention is to provide a simple and reliable method of recovery treatment for recovering the ferroelectric liquid crystal device from image sticking if image sticking occurs at all in the ferroelectric liquid crystal device.

To achieve the above objects, according to the treatment of the present invention, a low-frequency AC voltage is applied to the ferroelectric liquid crystal device, thereby forming multiple domains in a pixel, causing domain boundaries to flow, and inducing fine segmentation of domain regions.

(Operation)

In operation, the treatment for preventing the occurrence of image sticking is performed in the following manner.

In the ferroelectric liquid crystal device, when leaving the liquid crystal in one of its stable states for a long time, an AC voltage, whose frequency is distinctly lower than that of the usual liquid crystal driving waveform and whose amplitude does not exceed the threshold of the liquid crystal, is applied in advance to the liquid crystal device. For example, an AC voltage having a frequency of 10 to 100 Hz and an amplitude of ±1.5 to ±3.0 V is applied for about one minute. As a result, domains consisting of two stable states are formed within a pixel, and the domains are repeatedly segmented with the domain boundaries flowing in an irregular manner, eventually resulting in the formation of finely dispersed multiple domains.

In the ferroelectric liquid crystal device treated as described above, when the liquid crystal was driven in the usual way after leaving it in one of its stable states for a long time, image sticking did not occur.

On the other hand, the treatment for recovering the liquid crystal from image sticking is performed in the following manner.

In the ferroelectric liquid crystal where image sticking has occurred after being left in one of its stable states for a long time, an AC voltage, whose frequency is distinctly lower than that of the usual liquid crystal driving waveform and whose amplitude does not exceed the threshold of the liquid crystal, is applied in the same manner as earlier described. For example, an AC voltage having a frequency of 10 to 100 Hz and an amplitude of ±1.5 to ±3.0 V is applied. As a result, domains consisting of two stable states are formed within a pixel. Then, the domains are repeatedly segmented with the domain boundaries flowing in an irregular manner, eventually resulting in the formation of finely dispersed multiple domains.

In the ferroelectric liquid crystal device treated as described above, image sticking did not occur in the subsequent liquid crystal driving, and it was observed that the electric symmetry in the liquid crystal cell had been nearly perfectly restored.

ADVANTAGEOUS EFFECT OF THE INVENTION

Using the treatment method of the present invention, the image sticking phenomenon that would occur in the ferroelectric liquid crystal when the liquid crystal was held in one of its stable states can be prevented in a simple and reliable manner, by applying the low-frequency AC voltage.

Further, by using the treatment method of the present invention, recovery from image sticking can be accomplished in a short period of time in a simple manner, by applying the low-frequency AC voltage and without specifically requiring the provision of heating means or the like. Accordingly, by incorporating the low-frequency AC voltage application means into the liquid crystal device together with image sticking detection means, image sticking of the liquid crystal device can be prevented and, further, recovery from image sticking can be accomplished. As a result, the liquid crystal device of high quality can always be obtained without depending on the history of the liquid crystal state.

DETAILED DESCRIPTION OF THE INVENTION

Figure 1:
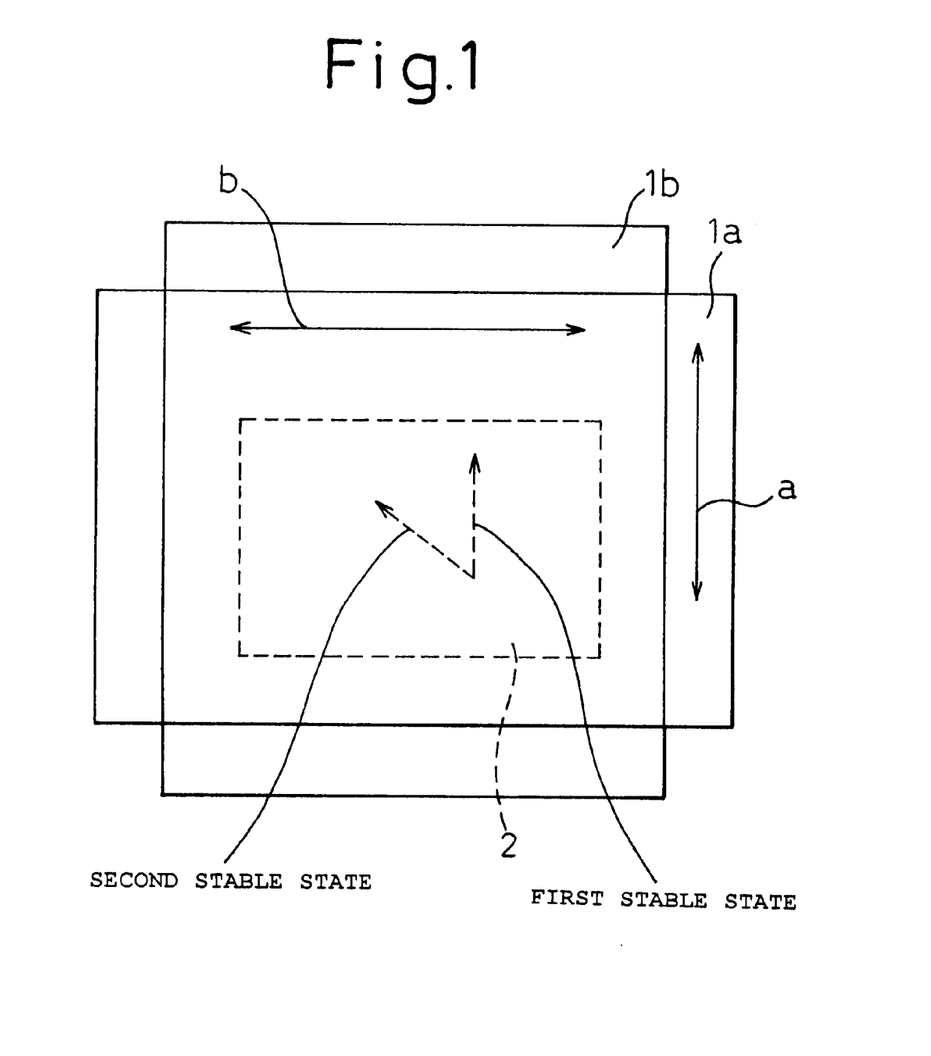
FIG. 1 is a diagram showing the arrangement of a ferroelectric liquid crystal cell and polarizers.

FIG. 1 is a diagram showing the arrangement of polarizers when ferroelectric liquid crystal is used as a liquid crystal cell. Between the polarizers 1a and 1b arranged in a crossed Nicol configuration is placed the liquid crystal cell 2 in such a manner that the long axis direction of liquid crystal molecules when the molecules are in a first stable state or in a second stable state is oriented substantially parallel to either the polarization axis, a, of the polarizer 1a or the polarization axis, b, of the polarizer 1b.

Figure 2:
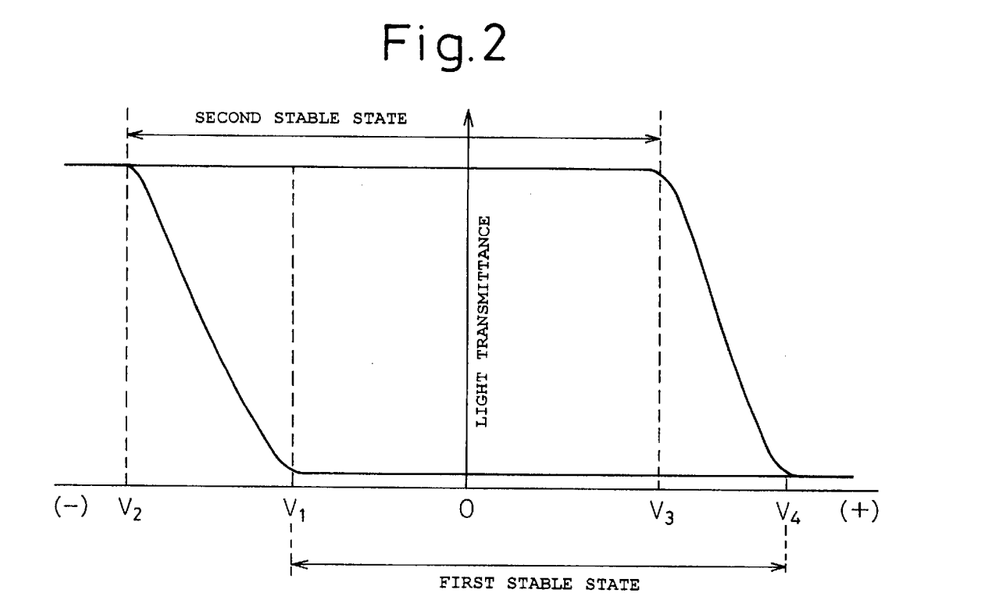
FIG. 2 is a diagram showing how the light transmittance of the ferroelectric liquid crystal cell varies with an applied voltage.

When voltage is applied across the thus arranged liquid crystal cell, its light transmittance varies with the applied voltage, describing a loop as plotted in the graph of FIG. 2. The voltage value at which the light transmittance begins to change when the applied voltage is decreased is denoted by V1, and the voltage value at which the light transmittance reaches saturation is denoted by V2; on the other hand, the voltage value at which the light transmittance begins to drop when the applied voltage is increased into the region of the opposite polarity is denoted by V3, and the voltage value at and beyond which the light transmittance does not drop further is denoted by V4. As shown in FIG. 2, the first stable state is selected when the value of the applied voltage is greater than the threshold of the ferroelectric liquid crystal molecules. When the voltage of the opposite polarity greater than the threshold of the ferroelectric liquid crystal molecules is applied, the second stable state is selected.

When the polarizers are arranged as shown in FIG. 1, a black display state (non-transmission state) can be produced in the first stable state and a white display state (transmission state) in the second stable state. The arrangement of the polarizers can be changed so that the white display state (transmission state) is produced in the first stable state and the black display state (non-transmission state) in the second stable state. The description hereinafter given, however, assumes that the polarizers are arranged so as to produce the black display state (non-transmission state) in the first stable state and the white display state (transmission state) in the second stable state.

Figure 3:
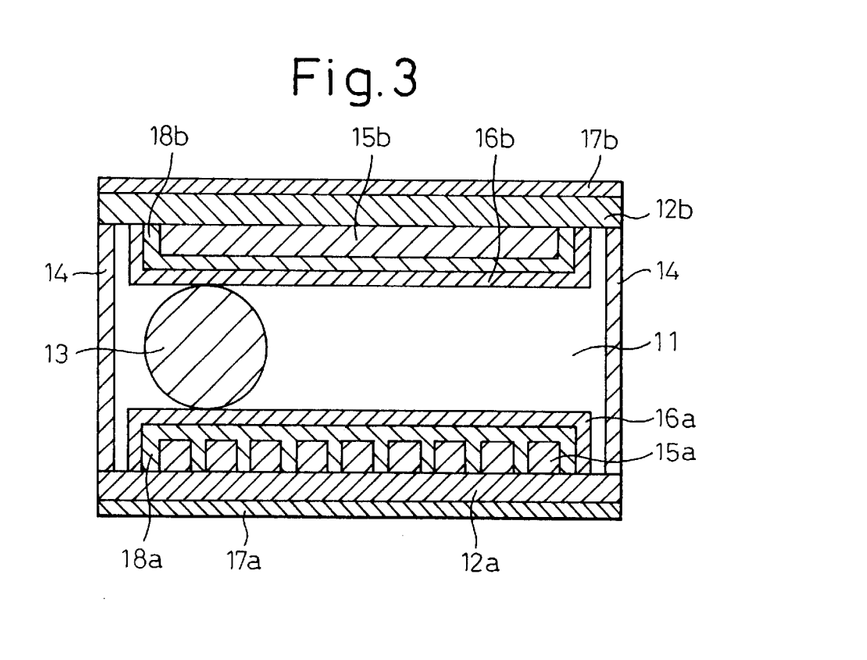
FIG. 3 is a diagram showing the structure of the ferroelectric liquid crystal cell used in the embodiments of the present invention.

FIG. 3 is a cross-sectional view showing the cell structure of a ferroelectric liquid crystal device used in the embodiments of the present invention. The ferroelectric liquid crystal cell used in the embodiments comprises: a ferroelectric liquid crystal layer with a thickness of about 1.7 $\mu$m; a pair of glass substrates 12a and 12b sandwiching the ferroelectric liquid crystal layer 11; a spacer member 13 for maintaining a gap; and a sealing member 14 for sealing the ferroelectric liquid crystal layer 11 against the outside environment. Scanning electrodes 15a and signal electrodes 15b are formed on the opposing surfaces of the glass substrates 12a and 12b, respectively. Insulating films 18a and 18b of tantalum pentoxide or the like for preventing short-circuiting are formed over the electrodes 15a and 15b, and obliquely evaporated inorganic alignment films 16a and 16b of silicon oxide or the like for aligning ferroelectric liquid crystal molecules are formed on top of them. On the outside surfaces of the glass substrates 12a and 12b are arranged polarizers 17a and 17b with the polarization axis of the polarizer 17a oriented parallel to the long axis direction of the ferroelectric liquid crystal molecules when the molecules are in one of the two stable states, and with the polarization axis of the polarizer 17b oriented at right angles to the polarization axis of the polarizer 17a.

Figure 4:
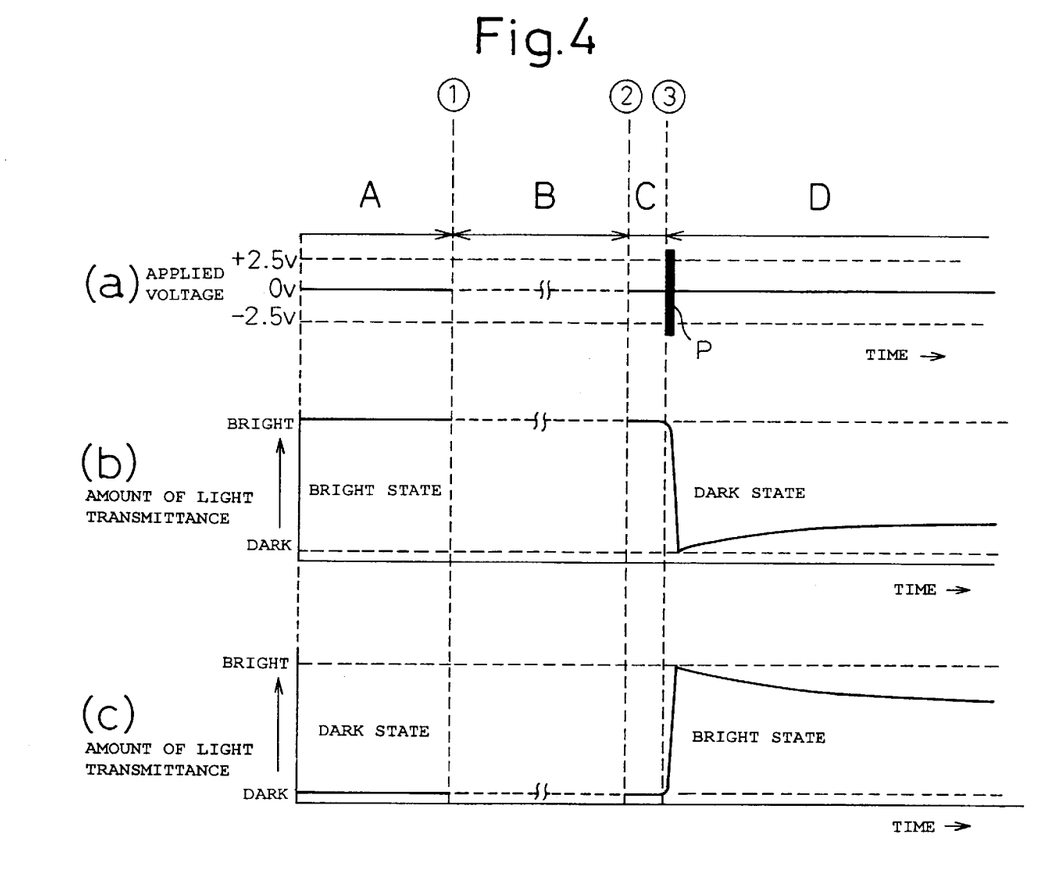
FIG. 4 is a diagram showing a voltage waveform applied to a liquid crystal and the variation in the amount of light transmission indicating the occurrence of image sticking.

FIG. 4 show graphs depicting how the driving waveform and the amount of light transmission change in the ferroelectric liquid crystal device when the image sticking prevention treatment of the present invention is not applied. FIG. 4(a) shows the voltage waveform applied to the liquid crystal, and FIGS. 4(b) and 4(c) each show the variation with time of the amount of light transmission when the voltage of FIG. 4(a) is applied.

In period A in FIG. 4, the liquid crystal is driven in the usual way. At time ①, driving power is turned off to stop the liquid crystal driving. In the next period B, the liquid crystal is not driven; then, to operate the liquid crystal device again, for example, 24 hours later, the power is turned on at time ② to start driving the liquid crystal. At time ③ after period C has elapsed from time ②, a voltage pulse P greater than the threshold of the liquid crystal is applied as the usual driving pulse, causing the liquid crystal to switch from one stable state to the other stable state or vice versa, and the state is maintained during period D.

FIG. 4(b) is a graph showing the variation of the amount of light transmission when the liquid crystal was set in bright state in period A. In FIG. 4(b), though the driving power is turned off at time ①, the liquid crystal is held in the bright state, for example, for 24 hours (period B indicated by dashed line). Next, when the power is turned on at time ② to start driving the liquid crystal, the liquid crystal state remains unchanged, i.e., held in the bright state. Accordingly, if this liquid crystal device is used as a display device, when the power is turned on at time ②, the liquid crystal device is in the bright state (period C). Next, when the pulse P is applied at time ③, the liquid crystal switches from one stable state to the other stable state. For a short period immediately following the switching, the liquid crystal is held in the dark state with its state having switched to the other stable state, and a high contrast is obtained. However, since the liquid crystal has been held in the bright state for a long period of time, the liquid crystal state drifts in the direction of the bright state as the time elapses. As a result, the amount of light transmission changes, and the contrast degrades. This phenomenon is the "image sticking phenomenon".

FIG. 4(c) is a graph showing the variation of the amount of light transmission when the liquid crystal was set in the dark state in period A. In FIG. 4(c), though the driving power is turned off at time ①, the liquid crystal is held in the dark state (period B indicated by dashed line). Next, when the power is turned on at time ② to start driving the liquid crystal, the liquid crystal state remains unchanged, i.e., held in the dark state. Accordingly, if this liquid crystal device is used as a display device, when the power is turned on at time ②, the liquid crystal device is in the dark state (period C). Next, when the pulse P is applied at time ③, the liquid crystal switches from one stable state to the other stable state. For a short period immediately following the switching, the liquid crystal is held in the bright state with its state having switched to the other stable state, and a high contrast is obtained. However, since the liquid crystal has been held in the dark state for a long period of time, the liquid crystal state drifts in the direction of the dark state as the time elapses. As a result, the amount of light transmission changes, and the contrast degrades.

Figure 5:
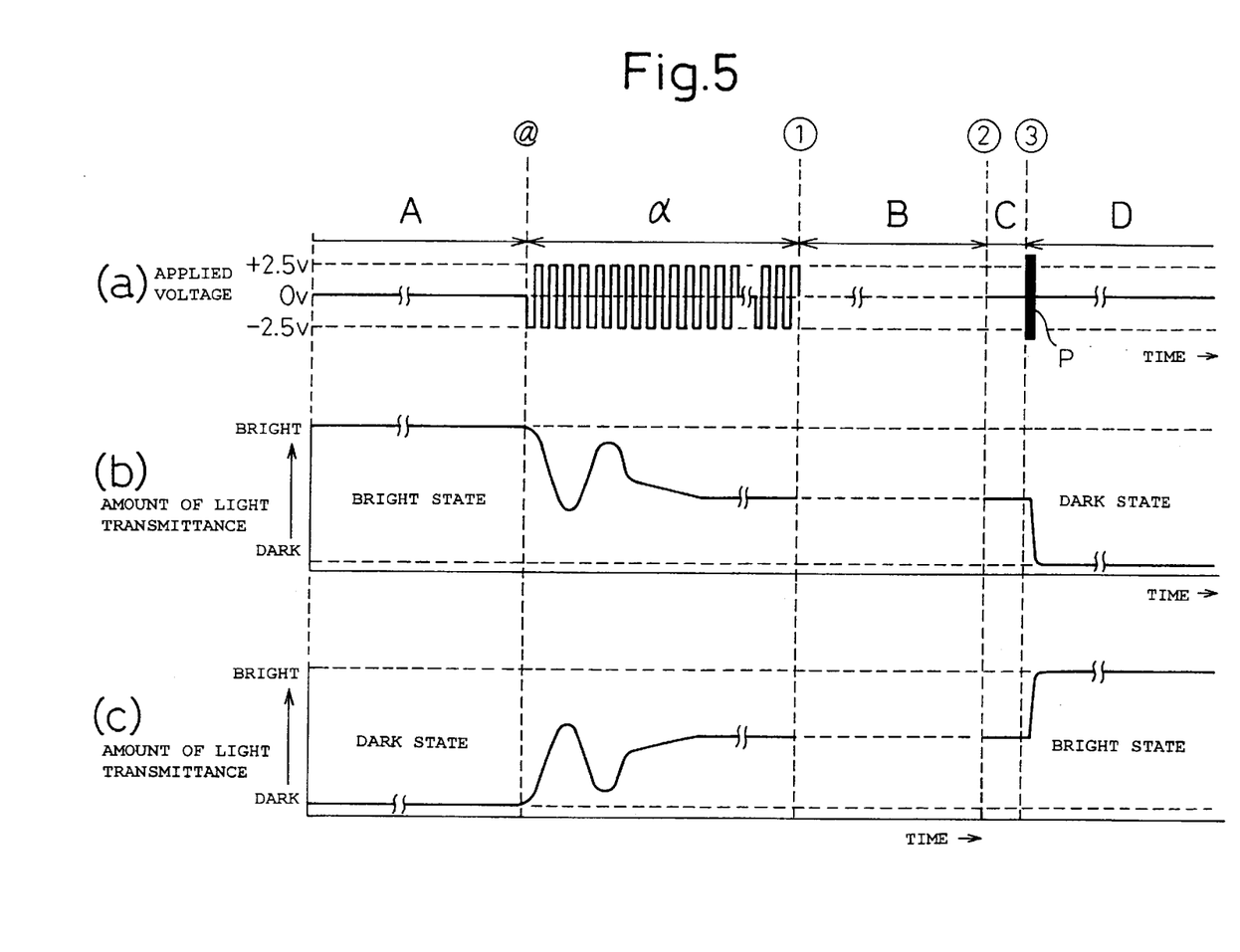
FIG. 5 is a diagram showing the applied voltage waveform and the variation in the amount of light transmission according to the embodiment of the image sticking prevention treatment method of the present invention.

FIG. 5 show graphs depicting how the driving waveform and the amount of light transmission change in the ferroelectric liquid crystal device when the image sticking prevention treatment of the present invention is applied. FIG. 5(a) shows the voltage waveform applied to the liquid crystal, and FIGS. 5(b) and 5(c) each show the variation with time of the amount of light transmission when the voltage of FIG. 5(a) is applied.

In period A in FIG. 5, the liquid crystal is driven in the usual way. For the duration of period a starting at time ⓐ and ending immediately before turning off the driving power to stop the liquid crystal driving, a low-frequency AC voltage is applied to the liquid crystal. For example, a rectangular AC wave having a frequency of 60 Hz and an amplitude of ±2.5 V is applied for one minute. Then, at time ①, the driving power is turned off. In the next period B, the liquid crystal is not driven; then, to operate the liquid crystal device again, for example, 24 hours later, the power is turned on at time ② to start driving the liquid crystal. At time ③ after period C has elapsed from time ②, a voltage pulse P greater than the threshold of the liquid crystal is applied as the usual driving pulse, causing the liquid crystal to switch from one stable state to the other stable state or vice versa, and the state is maintained during period D.

FIG. 5(b) is a graph showing the variation of the amount of light transmission when the liquid crystal was set in the bright state in period A. In FIG. 5(b), when the low-frequency AC voltage is applied to the liquid crystal at time ⓐ, the liquid crystal state fluctuates until it settles at a state intermediate between the bright and dark states at time ① when the power is turned off. Though the driving power is turned off at time ①, the liquid crystal is held in the intermediate state (period B indicated by dashed line). Next, when the power is turned on at time ② to start driving the liquid crystal, the liquid crystal state remains unchanged, i.e., held in the intermediate state. Accordingly, if this liquid crystal device is used as a display device, when the power is turned on at time ②, the liquid crystal device is in the intermediate state (period C). Next, the pulse P is applied at time ③ to set the liquid crystal in the dark state. In this case, no temporal variation was observed in the liquid crystal state, and contrast degradation did not occur. That is, the "image sticking phenomenon" was successfully prevented.

FIG. 5(c) is a graph showing the variation of the amount of light transmission when the liquid crystal was set in the dark state in period A. In FIG. 5(c), when the low-frequency AC voltage is applied to the liquid crystal at time ⓐ, the liquid crystal state fluctuates until it settles at a state intermediate between the bright and dark states at time ① when the power is turned off. Though the driving power is turned off at time ①, the liquid crystal is held in the intermediate state (period B indicated by dashed line). Next, when the power is turned on at time ② to start driving the liquid crystal, the liquid crystal state remains unchanged, i.e., held in the intermediate state. Accordingly, if this liquid crystal device is used as a display device, when the power is turned on at time ②, the liquid crystal device is in the intermediate state (period C). Next, the pulse P is applied at time ③ to set the liquid crystal in the bright state. In this case also, no temporal variation was observed in the liquid crystal state, and contrast degradation did not occur. That is, the "image sticking phenomenon" was successfully prevented.

In the above embodiment, the low-frequency AC voltage is applied when turning off the power to stop the liquid crystal driving; alternatively, the low-frequency AC voltage may be applied when turning on the power to start liquid crystal driving, in which case also the "image sticking" phenomenon can be prevented.

FIG. 6 is a diagram showing how the state of the ferroelectric liquid crystal device and the domain structure in a pixel change when the image sticking prevention treatment of the embodiment shown in FIG. 5 is applied. FIGS. 6(d), 6(e), and 6(f) are enlarged views of important portions of FIGS. 6(a), 6(b), and 6(c), respectively.

Figure 6A:
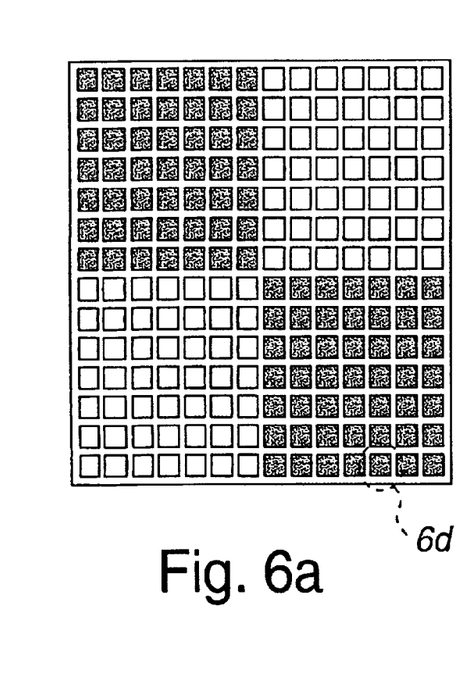
FIG. 6 is a diagram showing how the state of the ferroelectric liquid crystal device and the domain structure in a pixel change when the image sticking prevention and recovery treatment according to the embodiment of the present invention is performed.

As shown in FIG. 6(a), each pixel in the liquid crystal device is set in either the dark state or the bright state. Each pixel in the dark state forms a single domain consisting of one stable state as shown, for example, in FIG. 6(d). The previously described image sticking phenomenon occurs in the ferroelectric liquid crystal device held in this state for 24 hours.

Figure 6B:
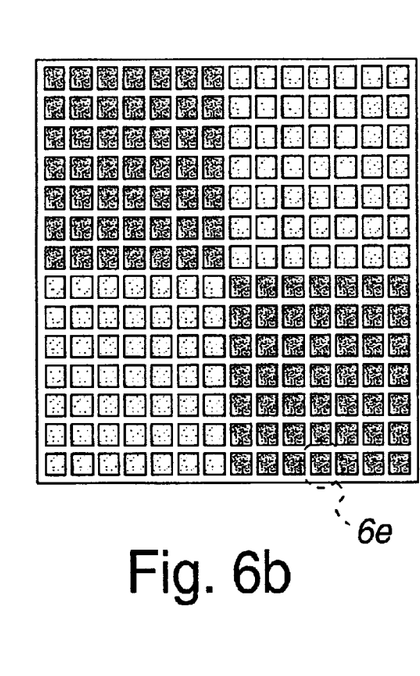
Figure 6C:
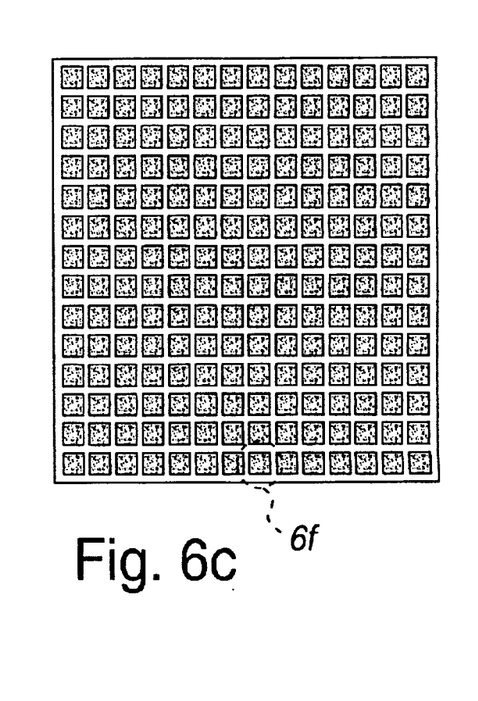
Figure 6D:
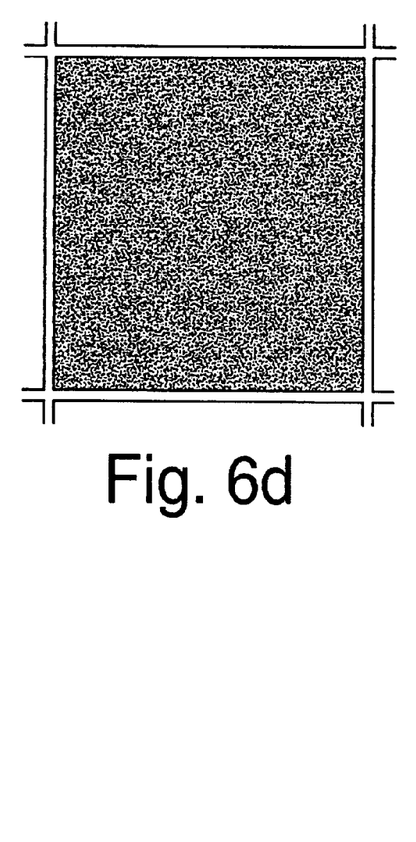
Figure 6E:
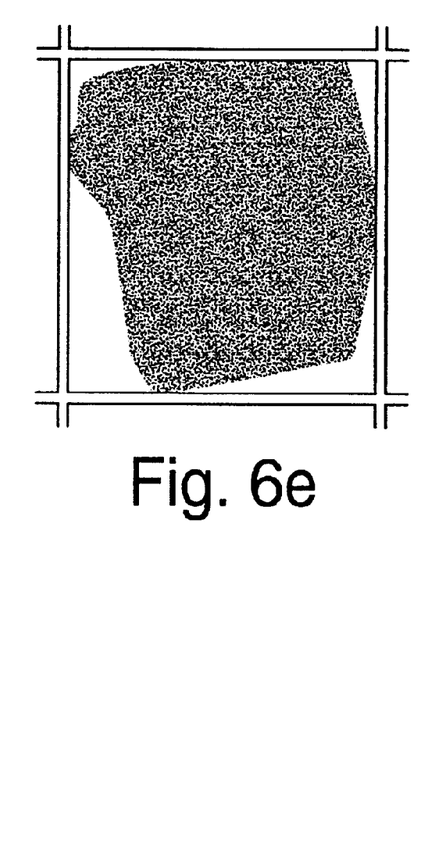
Figure 6F:
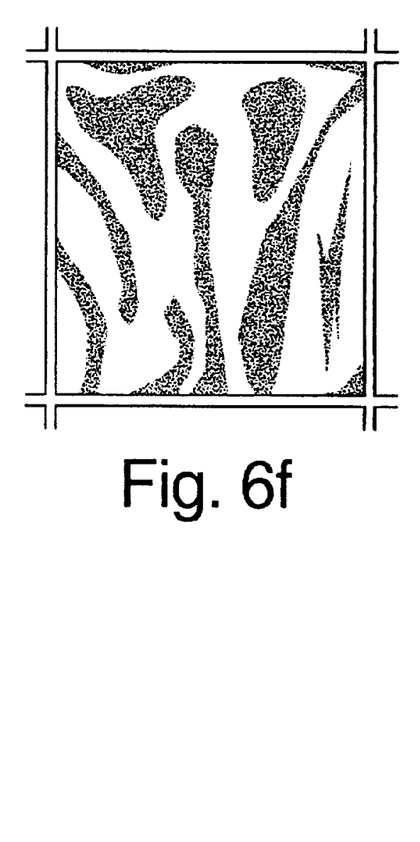

When the low-frequency AC voltage is applied to the ferroelectric liquid crystal device where image sticking has occurred, a domain consisting of the other stable state is formed and a multi-domain structure results, as shown in FIG. 6(e). The domains are then gradually segmented with their boundaries flowing in an irregular manner in response to the low-frequency AC voltage, and eventually, a microscopic multi-domain structure with the segmented domains uniformly dispersed is formed as shown in FIG. 6(f). In this process, the liquid crystal state is averaged and set in the intermediate state, as shown in FIGS. 6(b) and 6(c). The gentle flow of the domain regions observed in this process and the application of the low-frequency AC voltage inducing the flow are the essential requirements for the prevention of image sticking.

In the present embodiment, a rectangular AC wave having a frequency of 60 Hz and an amplitude of ±2.5 V is applied as the low-frequency AC voltage, but the same effect can be obtained if an AC voltage with a frequency in the range of 10 to 100 Hz and an amplitude in the range of ±1.5 V to ±3 V is used. Further, in the above embodiment, the length of time to apply the low-frequency AC voltage has been set to one minute, but it has been found a similar effect can be obtained as long as the length of time is set to 30 seconds or longer. However, since the length of time to apply the low-frequency AC voltage differs depending on the liquid crystal device used, the duration of that time should be appropriately set for each individual liquid crystal device. The above embodiment has been described assuming that the time interval from the time the power is turned off until the liquid crystal operation is resumed is 24 hours, but it will be recognized that if this time interval is longer or shorter than 24 hours, image sticking of the liquid crystal device can be prevented by using the treatment method of the present invention.

Further, gradually increasing the frequency and/or gradually decreasing the amplitude of the low-frequency AC voltage after the application of the low-frequency AC voltage would be an effective method; by so doing, a more uniform domain dispersion can be obtained.

The above embodiment has been described by taking as an example the case when power is turned off to an electronic appliance equipped with the liquid crystal device. It will, however, be appreciated that the above embodiment can be applied not only at the time of power off but also at the time that the driving of the electronic appliance equipped with the liquid crystal device is stopped, in which case also the same effect can be obtained. The same effect can also be obtained if the above embodiment is applied when shipping the ferroelectric liquid crystal device from the factory.

Figure 7:
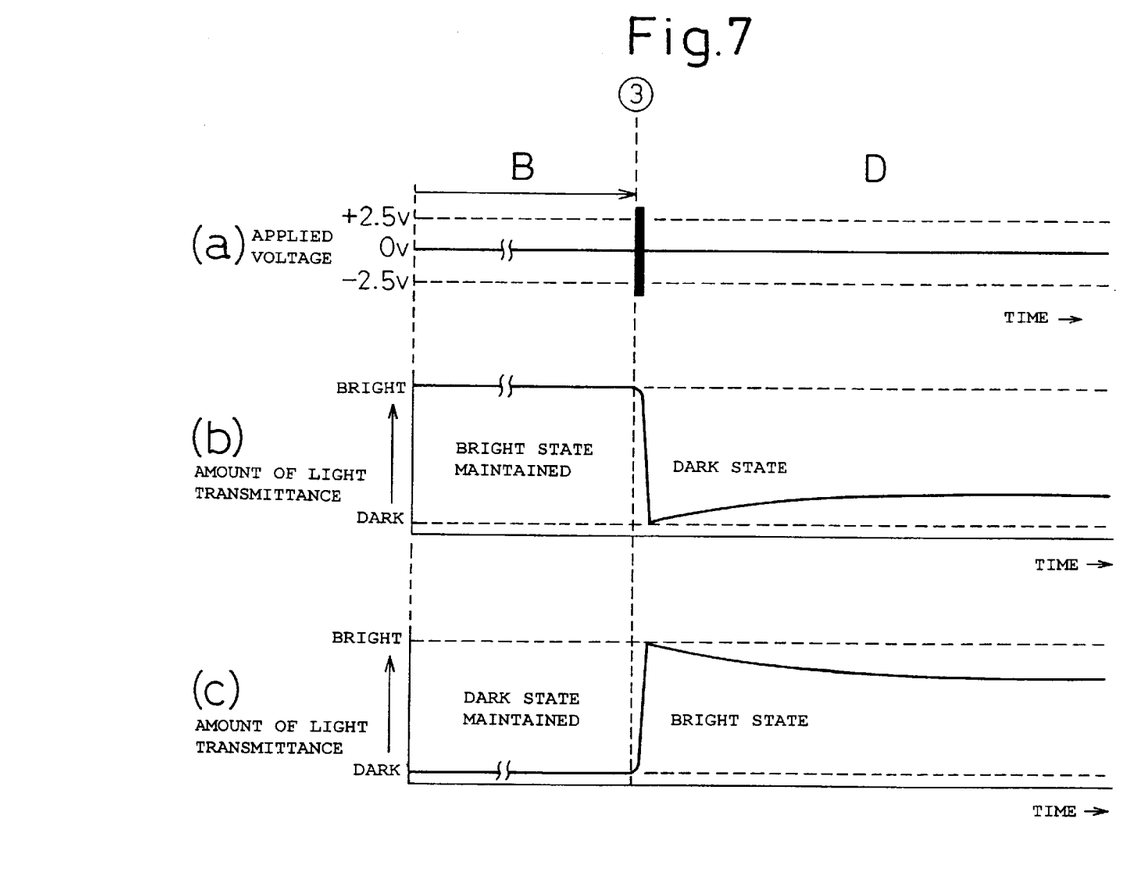
FIG. 7 is a diagram showing the voltage waveform applied to the liquid crystal and the variation in the amount of light transmission indicating the occurrence of image sticking.

FIG. 7 show graphs depicting how the driving waveform and the amount of light transmission change in the ferroelectric liquid crystal device when the image sticking recovery treatment of the present invention is not applied. FIG. 7(a) shows the voltage waveform applied to the liquid crystal, and FIGS. 7(b) and 7(c) each show the variation with time of the amount of light transmission when the voltage of FIG. 7(a) is applied.

In period B in FIG. 7, the liquid crystal is driven; it is assumed here that the liquid crystal has been held in one of the stable states for a long period of time, for example, 24 hours. Then, at time ③, a voltage pulse P greater than the threshold of the liquid crystal is applied as a driving pulse, causing the liquid crystal to switch from one stable state to the other stable state or vice versa, and the state is maintained during period D.

FIG. 7(b) is a graph showing the variation of the amount of light transmission when the liquid crystal was set in the bright state in period B. In FIG. 7(b), when the pulse P is applied at time ③, the liquid crystal switches from one stable state to the other stable state. For a short period immediately following the switching, the liquid crystal is held in the dark state with its state having switched to the other stable state, and a high contrast is obtained. However, the liquid crystal state drifts in the direction of the bright state as the time elapses. As a result, the amount of light transmission changes, and the contrast degrades. That is, the "image sticking phenomenon" occurs.

FIG. 7(c) is a graph showing the variation of the amount of light transmission when the liquid crystal was set in the dark state in period B. In FIG. 7(c), when the pulse P is applied at time ③, the liquid crystal switches from one stable state to the other stable state. For a short period immediately following the switching, the liquid crystal is held in the bright state with its state having switched to the other stable state, and a high contrast is obtained. However, the liquid crystal state drifts in the direction of the dark state as the time elapses. That is, the image sticking phenomenon occurs, i.e., the amount of light transmission changes and the contrast degrades.

Figure 8:
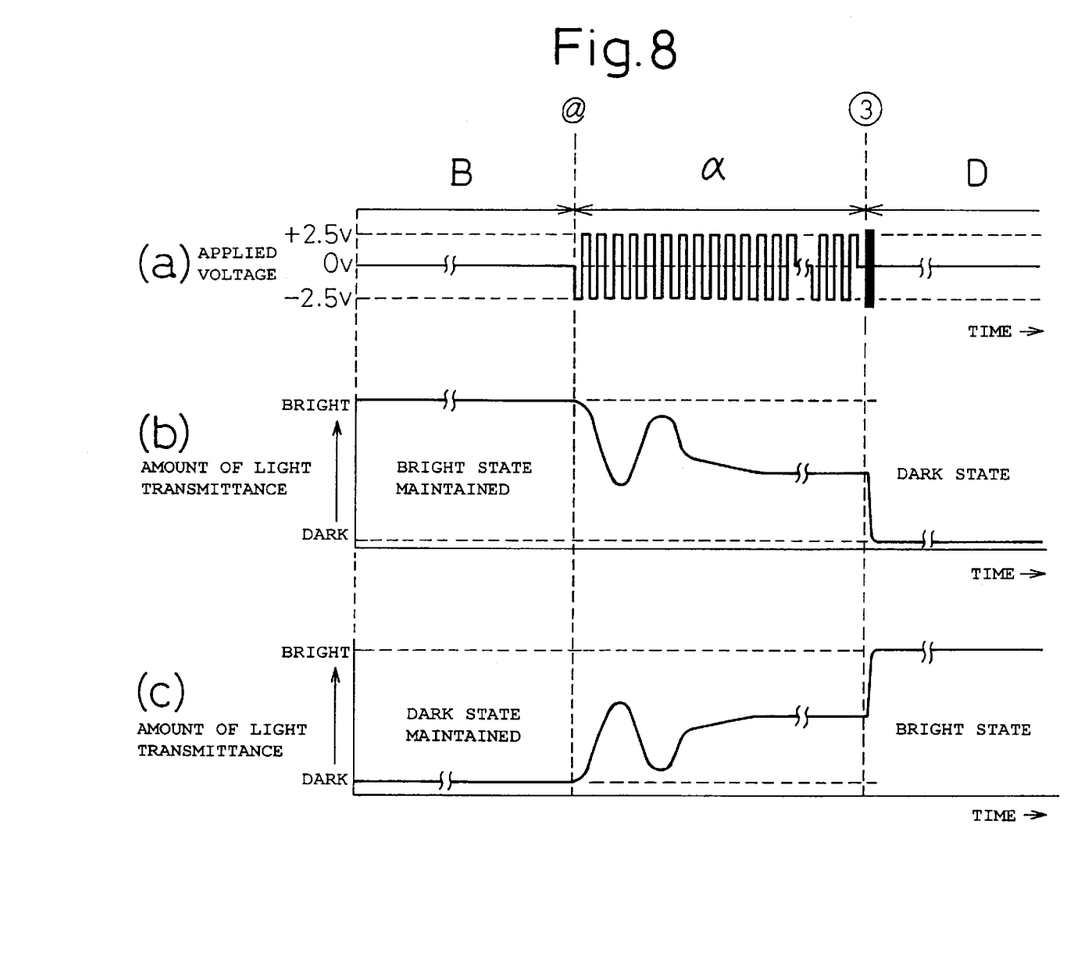
FIG. 8 is a diagram showing the applied voltage waveform and the variation in the amount of light transmission according to the embodiment of the image sticking recovery treatment method of the present invention.

FIG. 8 show graphs depicting how the driving waveform and the amount of light transmission change in the ferroelectric liquid crystal device when the image sticking recovery treatment of the present invention is applied. FIG. 8(a) shows the voltage waveform applied to the liquid crystal, and FIGS. 8(b) and 8(c) each show the variation with time of the amount of light transmission when the voltage of FIG. 8(a) is applied.

The liquid crystal is driven in period B in FIG. 8. When the occurrence of image sticking is detected during the driving of the liquid crystal, a low-frequency AC voltage is applied to the liquid crystal for the duration of period a starting at time ④ partway through the liquid crystal driving period. For example, a rectangular AC wave having a frequency of 60 Hz and an amplitude of ±2.5 V is applied for one minute. Next, when a voltage pulse P greater than the threshold of the liquid crystal is applied as a driving pulse at time ③, the liquid crystal switches from one stable state to the other stable state or vice versa, and the state is maintained during period D.

FIG. 8(b) is a graph showing the variation of the amount of light transmission when the liquid crystal was set in the bright state in period B. When the low-frequency AC voltage is applied to the liquid crystal at time @ in FIG. 8(b), the liquid crystal state fluctuates until it settles at a state intermediate between the bright and dark states at the end of the low-frequency AC voltage application. Next, the pulse P is applied at time ③ to set the liquid crystal in the dark state. In this case, no temporal variation was observed in the liquid crystal state, and contrast degradation did not occur. That is, the liquid crystal was successfully recovered from the "image sticking phenomenon".

FIG. 8(c) is a graph showing the variation of the amount of light transmission when the liquid crystal was set in the dark state in period B. In FIG. 8(c), when the low-frequency AC voltage is applied to the liquid crystal at time @, the liquid crystal state fluctuates until it settles at a state intermediate between the bright and dark states at the end of the low-frequency AC voltage application. Next, the pulse P is applied at time ③ to set the liquid crystal in- the bright state. In this case also, no temporal variation was observed in the liquid crystal state, and contrast degradation did not occur. That is, the electric symmetry in the ferroelectric liquid crystal cell was restored, and the liquid crystal was successfully recovered from the "image sticking phenomenon".

In the above embodiment, the recovery treatment was performed after detecting the occurrence of image sticking, but the recovery treatment may be performed after the liquid crystal screen has changed a predetermined number of times.

During the image sticking recovery treatment of the embodiment shown in FIG. 8, the state of the ferroelectric liquid crystal device and the domain structure in a pixel change with time in the same manner as the structural changes explained with reference to FIG. 6. The low-frequency AC voltage, the duration of application, etc. are the same as those used in the embodiment shown in FIG. 5.

Figure 9:
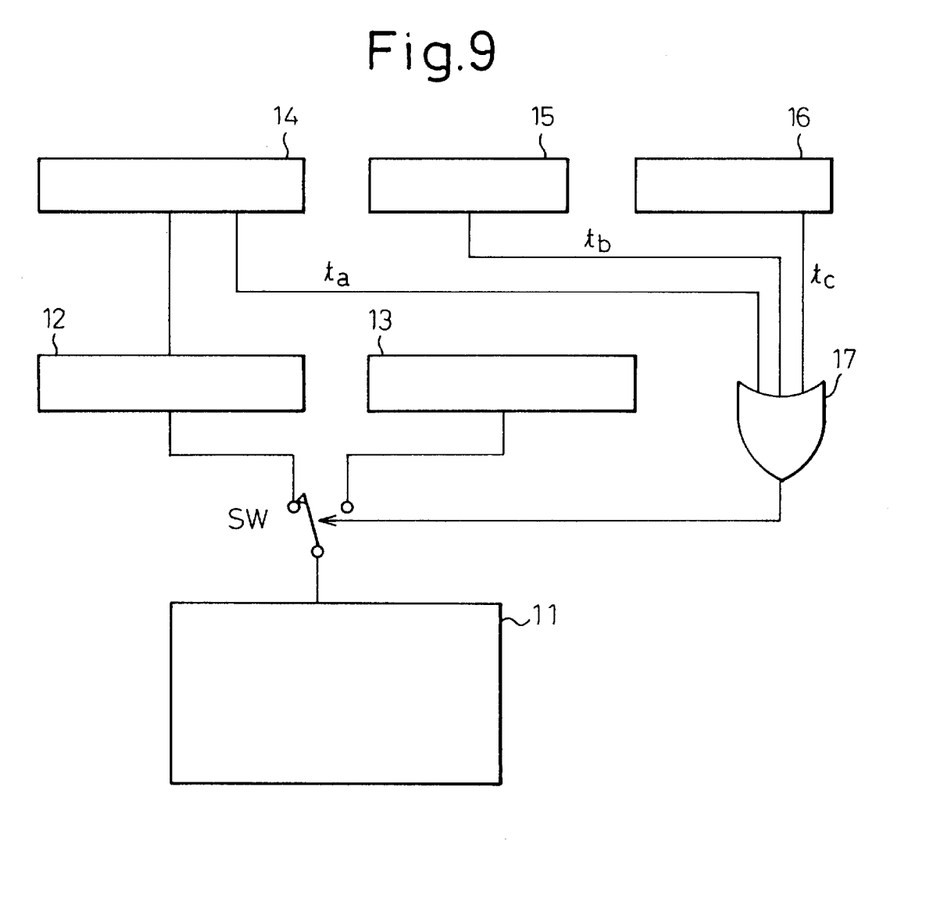
FIG. 9 is a block diagram of a driving circuit for the ferroelectric liquid crystal device, which is used to implement the treatment method of the present invention.

FIG. 9 is a block diagram of a driving circuit for the ferroelectric liquid crystal device, which is used to implement the treatment method of the present invention.

A voltage waveform from a liquid crystal driving voltage waveform generating circuit 12 or a low-frequency AC voltage waveform generating circuit 13 is applied via a selector switch SW to the ferroelectric liquid crystal device 11. The voltage waveform applied from the liquid crystal driving voltage waveform generating circuit 12 is for usual liquid crystal driving, while the voltage waveform applied from the low-frequency AC voltage waveform generating circuit 13 is for image sticking prevention and recovery according to the present invention. In the usual liquid crystal driving, the driving voltage is applied from the liquid crystal driving voltage waveform generating circuit 12 to the liquid crystal device 11, based on a control signal from a liquid crystal driving control circuit 14. A power supply circuit 15 supplies power for operating the ferroelectric liquid crystal device.

On the other hand, the liquid crystal driving control circuit 14 sends out a timing signal ta defining the timing for the low-frequency AC voltage waveform generating circuit 13 to apply the low-frequency AC voltage waveform to the liquid crystal device 11 during the liquid crystal driving. The power supply circuit 15 sends out a timing signal tb defining the timing for applying the low-frequency AC voltage waveform to the liquid crystal device 11 when turning power on or off. Further, an external circuit 16 sends out a timing signal tc defining the timing for applying the low-frequency AC voltage waveform to the liquid crystal device 11 at an arbitrary time. These timing signals are supplied via an OR circuit 17 to the SW, and the SW is thrown to the low-frequency AC voltage waveform generating circuit 13 side. Then, the low-frequency AC voltage waveform is applied to the liquid crystal device 11 for a predetermined length of time, for example, one minute.

The timing signal ta from the liquid crystal driving control circuit 14 occurs when the occurrence of image sticking is detected during the driving of the liquid crystal. Further, the timing signal ta occurs after the liquid crystal screen has changed a predetermined number of times, for example, tens of thousands of times. With this timing signal, the SW is thrown to apply the low-frequency AC voltage waveform as shown in FIG. 8, thereby recovering the liquid crystal from image sticking and preventing the occurrence of image sticking.

The timing signal tb from the power supply circuit 15 occurs immediately before the power is turned off when a power off operation is performed. With this timing signal, the SW is thrown to apply the low-frequency AC voltage waveform as shown in FIG. 5, thereby preventing the occurrence of image sticking. Further, when a power on operation is performed, the power supply circuit 15 sends the timing signal tb, and the SW is thrown to apply the low-frequency AC voltage waveform, thereby preventing image sticking from occurring in the subsequent liquid crystal driving.

The timing signal tc is sent from the external circuit 16 at an arbitrary time, for example, during the period when the power is off and the liquid crystal device is not being driven. With this timing signal, the SW is thrown to apply the low-frequency AC voltage waveform, thereby preventing image sticking from occurring when the liquid crystal driving is resumed.

The timing signal tc is also sent from the external circuit 16 at an arbitrary time during the liquid crystal driving. With this timing signal, the SW is thrown to apply the low-frequency AC voltage waveform to prevent image sticking from occurring thereafter.

The external circuit 16 may be constructed, for example, from a switching circuit which is operated at an arbitrary time to turn on the switch and send out the timing signal tc. Further, the switch may be turned on automatically at prescribed intervals of time to send out the timing signal tc.

What is claimed is:

1. A method of image sticking prevention and recovery treatment for a ferroelectric liquid crystal device having a ferroelectric liquid crystal layer and electrodes to which a first voltage is applied for driving the liquid crystal device, wherein a low-frequency AC voltage, distinct from the first driving voltage used to drive the liquid crystal device, is applied to the electrodes for forming multiple domains in which bright display regions and dark display regions are intermingled in a pixel in said ferroelectric liquid device, causing domain boundaries to flow, and inducing fine segmentation of domain regions, said low-frequency AC voltage having a frequency of 10 to 100 Hz and an amplitude of ±1.5 to ±3.0 V and applied to said ferroelectric liquid crystal device for a predetermined period.

2. A method of image sticking prevention and recovery treatment for a ferroelectric liquid crystal device as claimed in claim 1, wherein after applying said low-frequency AC voltage for said predetermined period, either the frequency of said low-frequency AC voltage is gradually increased or the amplitude thereof is gradually decreased.

3. A method of image sticking prevention and recovery treatment for a ferroelectric liquid crystal device as claimed in claim 1 or 2, wherein said predetermined period is not shorter than 30 seconds.

4. A method of image sticking prevention and recovery treatment for a ferroelectric liquid crystal device as claimed in claim 1, wherein said low-frequency AC voltage is applied immediately before driving of said ferroelectric liquid crystal device is stopped.

5. A method of image sticking prevention and recovery treatment for a ferroelectric liquid crystal device as in claim 1, wherein said low-frequency AC voltage is applied immediately after driving of said ferroelectric liquid crystal device is started.

6. A method of image sticking prevention and recovery treatment for a ferroelectric liquid crystal device as in claim 1, wherein said low-frequency AC voltage is applied prior to shipping said ferroelectric liquid crystal device from factory.

7. A method of image sticking prevention and recovery treatment for a ferroelectric liquid crystal device as in claim 1, wherein said low-frequency AC voltage is applied when the occurrence of image sticking is detected during driving of said ferroelectric liquid crystal device.

8. A method of image sticking prevention and recovery treatment for a ferroelectric liquid crystal device as in claim 1, wherein said low-frequency AC voltage is applied when a liquid crystal screen has changed a predetermined number of times during driving of said ferroelectric liquid crystal device.

9. A method of image sticking prevention and recovery treatment for a ferroelectric liquid crystal device as in claim 1, wherein said low-frequency AC voltage is applied at an arbitrary time when said ferroelectric liquid crystal device is not being driven.

10. A method of image sticking prevention and recovery treatment for a ferroelectric liquid crystal device as in claim 1, wherein said low-frequency AC voltage is applied at an arbitrary time when said ferroelectric liquid crystal device is being driven.

11. A ferroelectric liquid crystal device having at least one pixel, comprising a first voltage waveform generating circuit for driving the ferroelectric liquid crystal device to set the at least one pixel in a bright or dark state; a second voltage waveform generating circuit for generating a low-frequency AC voltage waveform for forming multiple domains in which bright display regions and dark display regions are intermingled in the at least one pixel in the ferroelectric liquid crystal device, causing domain boundaries to flow, and inducing fine segmentation of domain regions; and a switch for applying when actuated the low-frequency AC voltage waveform to the at least one pixel, and wherein the low-frequency AC voltage waveform is an AC voltage with a frequency of 10 to 100 Hz and an amplitude of ±1.5 to ±3.0 V, and is applied to the at least one pixel for at least 30 seconds by the switch when actuated.

12. A ferroelectric liquid crystal device according to claim 11, further comprising a timing signal source for actuating the switch when an image sticking phenomenon occurs during the driving of the ferroelectric liquid crystal device or after a liquid crystal display containing the at least one pixel changes a predetermined number of times.

13. A ferroelectric liquid crystal device according to claim 11, further comprising a power supply circuit for generating a timing signal to actuate the switch immediately before the first voltage waveform generating circuit is turned OFF or when the first voltage waveform generating circuit is turned ON.

14. A ferroelectric liquid crystal device according to claim 11, further comprising a circuit for generating a timing signal to actuate the switch at arbitrary times when the ferroelectric liquid crystal device is being driven by the first voltage waveform generating circuit.

15. A ferroelectric liquid crystal device according to any one of claim 11–14, wherein the at least one pixel comprises a plurality of pixels arranged in a matrix.

16. A ferroelectric liquid crystal device having at least one pixel, comprising a first voltage waveform generating circuit for driving the ferroelectric liquid crystal device to set the at least one pixel in a bright or dark state; a second voltage waveform generating circuit for generating a low-frequency AC voltage waveform for forming a domain consisting of one stable state and a domain consisting of another stable state in the at least one pixel in said ferroelectric liquid crystal device, resulting in a multi-domain structure, causing domain boundaries to flow, and inducing fine segmentation of domain regions; wherein the low-frequency AC voltage waveform is an AC voltage with a frequency of 10 to 100 Hz and an amplitude of ±1.5 to ±3.0 V; and a switch for applying when actuated the low-frequency AC voltage waveform to the at least one pixel for a predetermined period.

17. A ferroelectric liquid crystal device according to claim 16 wherein the at least one pixel comprises a plurality of pixels arranged in a matrix.

* * * * *